United States Patent
Inman et al.

(10) Patent No.: US 6,202,389 B1
(45) Date of Patent: Mar. 20, 2001

(54) BAGGING MACHINE

(75) Inventors: Larry R. Inman, Warrenton; Michael H. Koskela, Astoria; Richard G. Lovell, Warrenton, all of OR (US)

(73) Assignee: Ag-Bag International Limited, Warrenton, OR (US)

( * ) Notice: Subject to any disclaimer, the term of this patent is extended or adjusted under 35 U.S.C. 154(b) by 0 days.

(21) Appl. No.: 09/335,240

(22) Filed: Jun. 17, 1999

(51) Int. Cl.$^7$ .................................................. B65B 1/04
(52) U.S. Cl. ........................ 53/436; 53/459; 53/527; 53/567; 53/576; 141/73; 141/313
(58) Field of Search ......................... 53/436, 459, 527, 53/529, 567, 576; 141/71, 73, 74, 114, 313, 317; 100/65, 66

(56) References Cited

U.S. PATENT DOCUMENTS

| | | |
|---|---|---|
| 3,687,061 * | 8/1972 | Eggenmuller et al. .............. 100/65 |
| 5,297,377 | 3/1994 | Cullen . |
| 5,395,286 | 3/1995 | Sgariboldi . |
| 5,439,182 | 8/1995 | Sgariboldi . |
| 5,671,594 | 9/1997 | Cullen . |
| 5,775,069 | 7/1998 | Cullen . |
| 5,857,313 | 1/1999 | Cullen . |
| 5,899,247 * | 5/1999 | Cullen ............................. 53/527 X |

* cited by examiner

*Primary Examiner*—John Sipos
(74) *Attorney, Agent, or Firm*—Robert L. Harrington

(57) ABSTRACT

A bagging machine for bagging material in an elongate bag. An anchor connected to a cable extends from the machine and resides in the material being placed in the bag. The anchor may be extended different distances from the machine to provide a varying restricting force to restrict the movement of the machine away from the bag being filled. Powered reels are provided to reel in cable or play out cable to vary the distance between the anchor and machine.

10 Claims, 2 Drawing Sheets

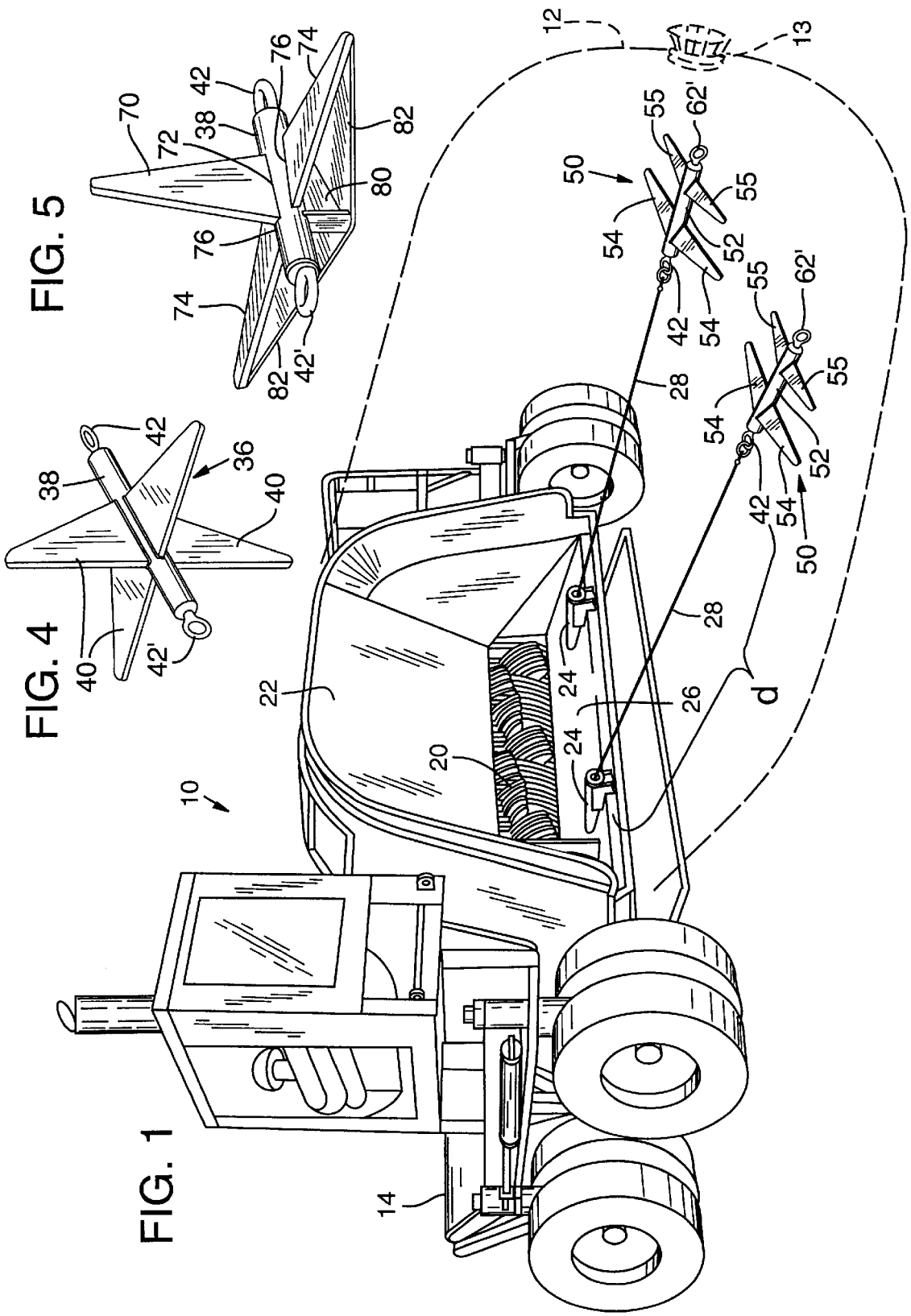

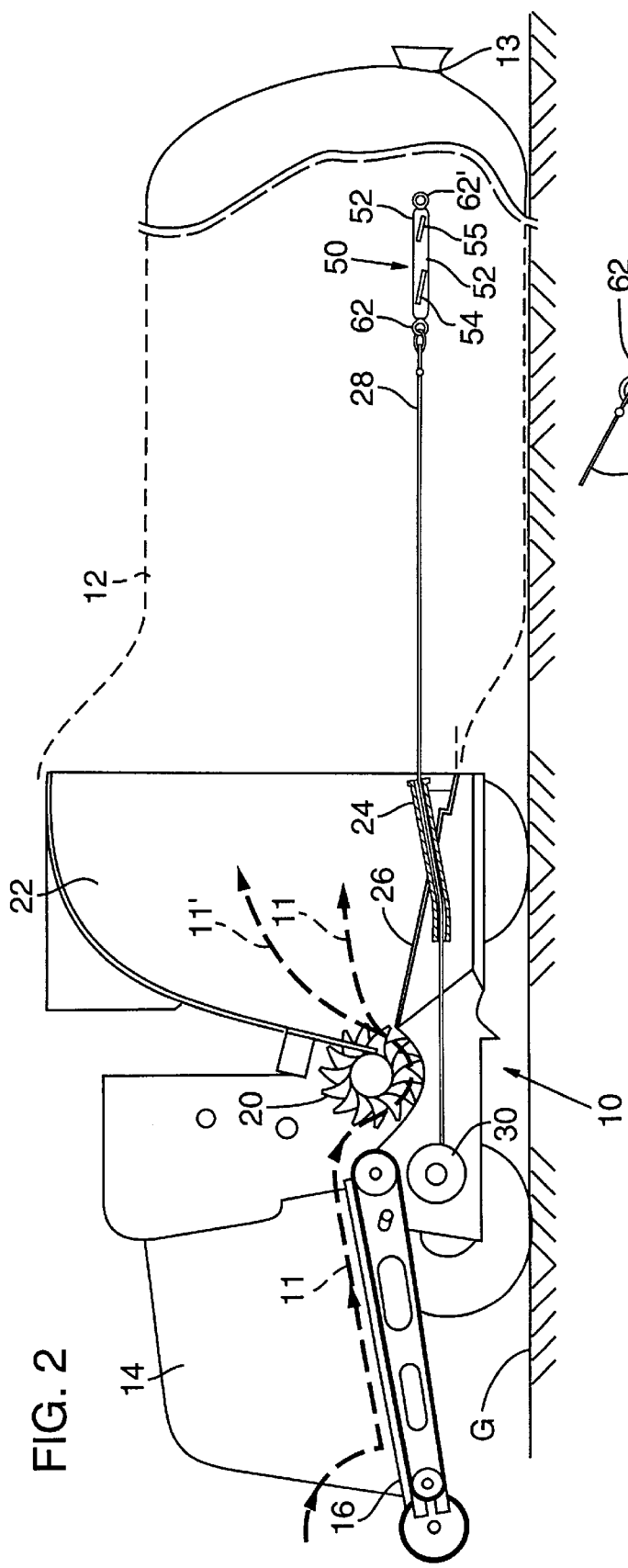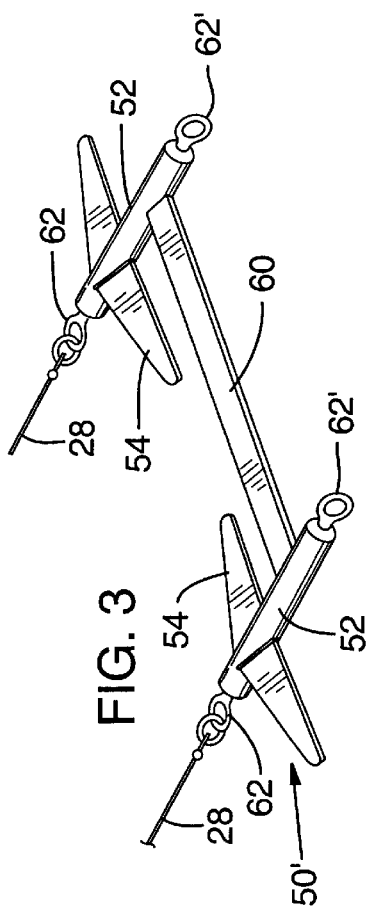

BAGGING MACHINE

FIELD OF THE INVENTION

This invention relates to a bagging machine and more particularly relates to mechanism for restricting movement of the bagging machine during a bag filling operation.

BACKGROUND OF THE INVENTION

In accordance with this invention, a method and apparatus for outdoor storage of agricultural products (silage, grain, etc.) and other materials to be stored (e.g., compost) produces such storage in large plastic bags, e.g., 4'–10' in diameter and 100'–200' in length. Filling the bag is accomplished with a bag filling machine or bagging machine. The machine includes a movable chassis, i.e., mounted on wheels, a tunnel mounted on the chassis, a hopper for receiving material and a rotor that forces the material from the hopper and into and through the tunnel from that end and out of the tunnel through the other end. A bag, e.g., having a 200' length, is gathered or folded in a manner to be mounted around the tunnel with an end closed and covering the exit end of the tunnel. Thus, material moved from the tunnel into the bag is deposited on the ground as the bag is filled. During the filling process, the movable machine moves forward and incremental portions of the bag are deployed from the tunnel.

A concern for the apparatus and process as described is the desire to fill the bag completely with the material. A loosely filled bag wastes storage space and increases cost. It is also more readily subject to tearing, e.g., under strong wind conditions, and depending on the material, the loosely filled bag can affect aeration and curing of the material being stored in the bag. Prior to the present invention, there were essentially three ways to obtain the desired complete filling of the bag. Initially a backstop was provided at the closed end of the bag with cables extending from the backstop to the bagging machine along each side of the bag. The cables were wound on rotatable drums. Brakes were provided on the drums. The brakes are pressure releasable and the pressure settings are adjustable. In operation the rotor forces the material into the tunnel and into the bag which is prevented from extending in length until the material is sufficiently compacted in the bag so that back pressure forces release of the drum brakes. The machine then rolls forward and the folded portion of the bag on the tunnel is deployed until the pressure is released whereupon the brake is reset. This cycle is repeated until the bag is totally filled.

It will also be noted that the machine's wheels have brakes that are also selectively used to provide resistance to forward movement of the machine. Such brakes by themselves are not sufficient as ground conditions can be wet, rough, sloped, etc. to alter the effectiveness of the wheel brakes. The exterior cables connected between the backstop and machine are effective but are somewhat dangerous and cumbersome. The cables and drums add extra cost (e.g., the cables are each in excess of 200' long and the drums must accommodate that length during site-to-site movement and at start up). The cables are under stress and if they should break, they can threaten the safety of persons standing near. Upon completion of a bag filling operation and before the machine can be moved to a new site and the filling operation continued, the cables have to be rewound onto the drums (a tedious and time consuming operation). (Examples of such exterior cable use are illustrated in U.S. Pat. No. 5,159,877.)

A more recent development is the precompaction of the material which take place inside the tunnel. A barrier is provided in the tunnel which inhibits flow from the tunnel into the bag. The barrier impedes flow primarily in the lower half of the tunnel, in the path of direct flow from the rotor, thus forcing the material to flow in large part up and over the barrier. The effect is that the tunnel is filled and the material is compacted before the material enters the bag resulting in the bag being substantially filled. Known barriers include gates, cables extended between the tunnel walls and flanges protruded from the tunnel walls or floor. Such barriers are exemplified by U.S. Pat. Nos. 5,860,271 and 5,671,594.

BRIEF DESCRIPTION OF THE PRESENT INTENTION

It is considered preferable to provide a more reliable filling of the bag, i.e., more reliable than any of the foregoing barriers described, such as previously existed with the use of the backstop and cables. However, the barrier process has advantages over the exterior cables and backstop as previously explained. The present invention has for its objective to provide a braking type function similar to that achieved in the backstop process but without the exterior cables.

The invention provides an anchor that is secured to a tether, e.g., a cable that extends from the machine to an anchor located in the bag's interior. Whereas the material is flowing relative to the tunnel, once the material is deposited in the bag, it becomes substantially stationary. The anchor is played out to a desired position inside the bag (and thus embedded in the compacted material) and the reel is then locked. Thereafter movement of the machine requires that the anchor be dragged through the compacted material. Depending on various factors, a number of which can be controlled, the resistance is substantial and sufficient to produce the braking of the machine in a manner similar to the prior backstop method but without the use of 200' cables and with the cables fully contained in the interior and not the exterior of the bag.

In a preferred embodiment, the anchors are configured with two pairs of laterally projected fins or flanges set at an angle (like an airplane wing) to maintain the anchor in a position elevated from the bottom of the bag. The configuration of the anchor can, however, be provided in a number of ways to produce the desired resistance to being dragged through the material. It will be appreciated that variation in drag pressure can also be achieved by the distance the anchor extends into the bag, i.e., the compaction being greater at a distance further into the bag than closer to the bag mouth.

Other advantages will become apparent to those skilled in the art from a reading of the following detailed description of the drawings referred to therein.

BRIEF DESCRIPTION OF THE DRAWINGS

FIG. 1 is a perspective view of a bagging machine;

FIG. 2 is a schematic side view of the bagging machine of FIG. 1; and

FIGS. 3, 4 and 5 are views of alternate anchors for the machine of FIGS. 1 and 2.

DESCRIPTION OF THE PREFERRED EMBODIMENT

FIGS. 1 and 2 illustrate a bagging machine 10 that is arranged to insert materials such as silage into an elongate bag 12, e.g., of flexible tough plastic or similar material. The bagging machine 10 has a hopper 14 in which the material is placed. A conveyor mechanism 16 transports the material toward and into a rotor 20. The rotor 20 forcibly propels the material through a tunnel portion 22 and into the elongate bag 12. The flow path of the material through the machine 10 is generally indicated by arrows 11 and 11' in FIG. 2.

The elongate bag 12 is fitted to the exit end of tunnel portion 22, initially in a folder or gathered condition but having an end position closed or tied off as indicated by reference 13. As the material is forced into the bag 12, the bag 12 will be deployed off of the machine 10. The bag 12, as material is being placed into it, is deposited on the ground G and as the deployed portion of the bag is filled, the pressure of the rotor forcing material into the bag will move the machine 10 away from the bag and sequentially deploy more of the bag off of the tunnel.

As explained in the Background Of The Invention, to achieve complete filling, the material needs to be compacted in the bag. The bagging machine's wheel brakes will suffice to provide satisfactory resistance in the start up phase but are inconsistent (as previously explained) over any appreciable distance. Thus a secondary compacting mechanism is preferred and is provided by the present anchoring system.

FIGS. 1 and 2 illustrate one example of an anchoring system for the machine 10. A pair of cable tubes 24 are extended through the floor 26 of the tunnel portion 22 at substantially equal distances from the opposed sides of the machine. The rear or exit ends of the tubes 24 are at or near the end of the tunnel portion 22 and above the floor 26 and provide a deployment socket for the cable and anchor. A pair of cables 28 are extended from powered reels 30 through the cable tubes 24 and connected to anchors 50. The cables 28 are deployed off the reels 30 to position the anchors 50 at a desired distance d from the end of the tunnel portion 22, e.g., 540 to 20' but typically in the 10' to 15' range. The lengthway position of the anchors 50 inside the bag which determines the depth of the anchor within the compacted material affects the resistance of the anchors to being dragged through the material. That is, at a shallow depth where compaction is not complete, the anchor will pull more easily through the material than when embedded at the depth where full compaction has taken place. Conversely, the greater the resistance by the anchor to being dragged, the greater the compaction. Thus, to adjust compaction, the cables 28 are allowed to reel out further to increase compaction or is retracted by power reeling of the cable back onto the reels 30 to reduce compaction.

FIGS. 1 and 2 illustrate one type of anchor that is connectable to the cables 28. The anchor 50 has a center post 52. Multiple shaped fins or flanges 54, 55 extend from the post 52. In this embodiment, four shaped fins or flanges extend from post 52, two in the front (fins 54) and two in the rear (fins 55). The size and shape of the anchor 50 will depend in part on the type of material being inserted in the bag 12. Hooks or eyelets 62, 62' are fixedly fastened to respective ends of the post 52 to facilitate connecting the anchor 50 to the cable 28. As will be observed, the fins or flanges 54, 55 are angled, e.g., 10°–30°, so that when drawn through the material, the anchor is urged in a cam like action in an upwardly direction as opposed to the downward pull of the cable. Such prevents the anchor from nosing down into the bottom wall of the bag with possible damage to the bag. Also, as will be observed, as dictated by the positioning of the tubes 24 on the machine, the cables and anchors are positioned symmetrically in the bag or substantially equal distances from the opposed sides of the bag. The braking affect as applied to the machine is accordingly balanced.

FIGS. 3 and 4 illustrate alternate examples of an anchor, designated by reference numbers 50' and 36, respectively. In FIG. 3 a connecting bar 60 replaces the rear fin 55 of anchor 50 and is extended between the posts 52 of the two anchors 50. The bar 60 may also be inclined at an angle with respect to the longitudinal axis of the post 52, e.g., similar to flanges 54.

FIG. 5 illustrates a multiple finned anchor as a further variation, with fins 40 projected from post 38 and including eyelets 42, 42'. FIG. 5 illustrates another variation of an anchor that has eyelets 42, 42' attached to a post 38. A triangular fin 70 extends from the post 38. The base 72 of the fin 70 lies substantially along a longitudinal axis of the post 38. Triangular fins 74 are extended from the post 38 with the base 76 of the fins 74 inclined at a slight angle to the longitudinal axis of the post 38. A tapered strut 80 is mounted to the post 38 opposite the fin 70. Triangular sections 82 are fitted to the strut 80 and are attached to the extending fins 74. Fins 74 and the triangular sections 82 in combination form a tapered wedge.

These different versions of anchors are merely representative of the many forms such anchors can take. The bulk and formation of the anchor can serve as an additional way to vary the resistance to the anchor being pulled through the material.

In operation, and with reference to FIGS. 1 and 2, material to be bagged is fed into the hopper 14. The conveyor system 16 conveys the material to the rotor 20. The rotor 20 propels and forces the material into and against the closed end 13 of the bag 12. The material being forced against the end 13 of the bag 12 will cause a section of the bag 12 to be deployed off the tunnel portion 22 and the filled portion of the bag 12 will be deposited on the ground or supporting surface. As the bag 12 is being deployed off the tunnel portion 22, the cables 28 are controllably extended from the powered reel 30 to a desired position, e.g., as illustrated in the figures.

Initially the machine is braked with the wheel brakes as material is forced into the bag end. Sufficient bag length will be deployed from the tunnel and sufficient material flowed into that bag length to anchor or fix the bag end at the deployed position on the ground. Thereafter the material will be forced into the bag end to fill it and also to embed the anchor in the material. The wheel brakes will release in response to back pressure and the machine will move forward, releasing additional bag length until the cables become taut and the anchors take hold. Thereafter movement of the machine must overcome the resistance of the anchors to being pulled through the material (however, the wheel brakes can, of course, be employed to facilitate the resistance to machine movement as may be desired).

Those skilled in the art will recognize that modifications and variations may be made without departing from the true spirit and scope of the invention. The invention is therefore not to be limited to the embodiments described and illustrated but is to be determined from the appended claims.

What is claimed is:

1. A bagging machine comprising:
   a movable chassis movable along an underlying stationary support;
   a tunnel mounted on the chassis, said tunnel having an inlet end and an outlet end;
   a material mover mounted at the inlet end for receiving and moving material under pressure through the inlet end and into and through the tunnel;
   a material storage bag mounted to the tunnel at the outlet end and incrementally deployable from the tunnel and onto the stationary support, said storage bag having a closed end that closes the outlet end of the tunnel whereby movement of the material through the tunnel deposits the material into a deployed portion of the bag supported on the stationary support;

said storage bag gathered on the tunnel and deployed incrementally off the tunnel when a previously deployed portion of the bag is sufficiently filled with the material;

a mechanism for producing compaction of the material in the bag, said mechanism including an anchor tethered to the machine by a tether and embedded in the material in the bag whereby as the pressure generated by the moving material urges movement of the movable chassis relative to the bag, said movement is resisted by the anchor embedded in the material, the resistance producing compaction of the material; and a deployment control provided for the machine including a deployment socket mounted in the tunnel through which the tether is extended, and a mechanism for positioning the anchor between positions of retraction where the anchor is located in abutting relation to the socket and extension where the anchor is spaced from the socket and located in the bag.

2. A bagging machine as defined in claim 1 wherein said mechanism includes a pair of anchors tethered to the machine and embedded in the material in the bag, said anchors provided substantially at equal distances from the opposed sides of the bag.

3. A bagging machine as defined in claim 1 wherein said mechanism includes a powered reel rotatably secured to the machine for reeling in and reeling out the tether.

4. A bagging machine as defined in claim 1 wherein the anchor is configured with a body portion and fins laterally protruded from the body portion to increase resistance.

5. A bagging machine as defined in claim 4 wherein the body portion is elongated and the laterally protruded fins are angled relative to the elongated body at a forwardly, upwardly directed angle to induce elevation of the anchor while being dragged forwardly through the material.

6. A bagging machine as defined in claim 5 wherein a pair of said anchors are provided in the bag symmetrically from side to side, and a connecting bar connecting the anchors.

7. A method of filling a bag with loose material which comprises:

providing a movable bag filling machine that directs loose material into and through a tunnel and into a bag secured in a gathered condition at an exit end of the tunnel;

providing an anchor that is tethered to the machine with the tether extended through a socket in the tunnel for placement of the anchor in the bag, and further providing a tether control for alternative positioning of the anchor location as between a retracted position in abutting relation to the socket and a deployed position spaced from the socket and in the bag;

braking the machine and forcing material into the bag to thereby fill an end portion of the bag;

deploying the anchor for embedding the anchor in the material in the bag;

thereafter forcing material into the bag until exceeding the resistance of the anchor to being dragged through the material thereby forcing movement of the machine and deployment of incremental portions of the gathered bag.

8. A method as defined in claim 7 including:

adjusting the anchor resistance by reeling in or reeling out the tether.

9. A bagging machine comprising:

a movable chassis movable along an underlying stationary support;

a tunnel mounted on the chassis, said tunnel having an inlet end and an outlet end;

a material mover mounted at the inlet end for receiving and moving material under pressure through the inlet end and into and through the tunnel;

a material storage bag mounted to the tunnel at the outlet end and incrementally deployable from the tunnel and onto the stationary support, said storage bag having a closed end that closes the outlet end of the tunnel whereby movement of the material through the tunnel deposits the material into a deployed portion of the bag supported on the stationary support;

said storage bag gathered on the tunnel and deployed incrementally off the tunnel when a previously deployed portion of the bag is sufficiently filled with the material;

a mechanism for producing compaction of the material in the bag, said mechanism including an anchor tethered to the machine and embedded in the material in the bag whereby as the pressure generated by the moving material urges movement of the movable chassis relative to the bag, said movement is resisted by the anchor embedded in the material, the resistance producing compaction of the material; and said mechanism further including a powered reel rotatably secured to the machine for reeling in and reeling out the tether.

10. A method of filling a bag with loose material which comprises:

providing a movable bag filling machine that directs loose material into and through a tunnel and into a bag secured in a gathered condition at an exit end of the tunnel;

providing an anchor that is tethered to the machine and extended into the bag;

braking the machine and forcing material into the bag to thereby fill an end portion of the bag while embedding the anchor in the material in the bag;

thereafter forcing material into the bag until exceeding the resistance of the anchor to being dragged through the material thereby forcing movement of the machine and deployment of incremental portions of the gathered bag; and adjusting the anchor resistance by reeling in and reeling out the tether.

* * * * *